US009669446B2

United States Patent
Kohno et al.

(10) Patent No.: US 9,669,446 B2
(45) Date of Patent: Jun. 6, 2017

(54) DIE CUSHION FORCE SETTING APPARATUS

(71) Applicant: AIDA ENGINEERING, LTD., Sagamihara-shi, Kanagawa (JP)

(72) Inventors: Yasuyuki Kohno, Sagamihara (JP); Kazufumi Tsuchida, Sagamihara (JP); Junji Makabe, Sagamihara (JP)

(73) Assignee: AIDA ENGINEERING, LTD., Kanagawa (JP)

( * ) Notice: Subject to any disclaimer, the term of this patent is extended or adjusted under 35 U.S.C. 154(b) by 474 days.

(21) Appl. No.: 14/304,312

(22) Filed: Jun. 13, 2014

(65) Prior Publication Data
US 2014/0366606 A1    Dec. 18, 2014

(30) Foreign Application Priority Data

Jun. 14, 2013   (JP) .................. 2013-125121

(51) Int. Cl.
*B21D 24/02*    (2006.01)
*B30B 1/26*    (2006.01)
(Continued)

(52) U.S. Cl.
CPC ............... *B21D 24/02* (2013.01); *B30B 1/26* (2013.01); *B30B 15/061* (2013.01); *B30B 15/14* (2013.01); *G05B 19/46* (2013.01); *B21D 24/10* (2013.01)

(58) Field of Classification Search
CPC ........ B21D 24/02; B21D 24/08; B21D 22/22; B21D 24/14; B21D 24/10; B30B 15/061; B30B 15/14; B30B 1/26; G05B 19/46
(Continued)

(56) References Cited

U.S. PATENT DOCUMENTS 5,687,598 A    11/1997   Kirii et al.
6,711,797 B1 *   3/2004   Bennett .................. B41F 15/18
269/20
(Continued)

FOREIGN PATENT DOCUMENTS

CN    2709155 Y    7/2005
DE    4100206 A1    7/1992
(Continued)

OTHER PUBLICATIONS

European Search Report EP 14 17 2134 dated Oct. 27, 2014.
(Continued)

*Primary Examiner* — David B Jones
(74) *Attorney, Agent, or Firm* — McDermott Will & Emery LLP (57) ABSTRACT

The die cushion force setting apparatus according to an aspect of the present invention allows die cushion forces (component forces) acting on plural driving shafts to be set easily, makes it easy to apply strong or weak die cushion forces to a complex-shaped drawn part in a plane of a cushion pad, and provides a smooth die cushion force distribution. An operator manually enters a total die cushion force, axial component force of a left front hydraulic cylinder, and center-of-force position by operating an input device. Based on the information entered via the input device, the numerical computing device B1 calculates axial component forces of three hydraulic cylinders through numerical computations. The one axial component force thus entered and three axial component forces thus computed numerically are set as the axial component forces of four hydraulic cylinders.

14 Claims, 8 Drawing Sheets

(51) Int. Cl.
*B30B 15/06* (2006.01)
*B30B 15/14* (2006.01)
*G05B 19/46* (2006.01)
*B21D 24/10* (2006.01)

(58) Field of Classification Search
USPC .............................. 72/21.5, 351, 453.15, 350
See application file for complete search history.

(56) References Cited

U.S. PATENT DOCUMENTS

| | | | | |
|---|---|---|---|---|
| 6,898,837 | B1* | 5/2005 | Bennett | B41F 15/18 29/281.6 |
| 9,132,463 | B2* | 9/2015 | Ota | B21D 24/14 |
| 2013/0206499 | A1 | 8/2013 | Maruyama et al. | |

FOREIGN PATENT DOCUMENTS

| | | |
|---|---|---|
| DE | 102007033943 A1 | 1/2009 |
| EP | 1743718 A2 | 1/2007 |
| JP | 4-371326 A | 12/1992 |
| JP | 06-066822 U | 9/1994 |
| JP | 2009-106948 A | 5/2009 |
| JP | 2010-022435 A | 2/2010 |
| JP | 2012-129575 A | 7/2012 |

OTHER PUBLICATIONS

Notification of Reasons for Rejection Japanese Patent Application No. 2013-125121 dated May 28, 2015 with partial translation.
Official Communication issued in corresponding European Patent Application 14172134.0 dated Jan. 17, 2017.

* cited by examiner

DIE CUSHION FORCE SETTING APPARATUS

RELATED APPLICATIONS

This application claims the benefit of Japanese Application No. 2013-125121, filed on Jun. 14, 2013, the disclosure of which is incorporated by reference herein.

BACKGROUND OF THE INVENTION

Field of the Invention

The present invention relates to a die cushion force setting apparatus, and more particularly, to a die cushion force setting apparatus adapted to individually set die cushion forces (component forces) acting on plural driving shafts which support a cushion pad of a die cushion apparatus.

Description of the Related Art

Conventionally, a die cushion pin pressure control apparatus has been proposed for a die cushion apparatus which supports a cushion pad using plural hydraulic cylinders, wherein the hydraulic cylinders are divided into plural groups, a hydraulic supply line is installed for each group to supply hydraulic pressure to the group from a hydraulic pressure feeder, hydraulic-pressure adjustment mechanism (pressure control valve) is disposed in each hydraulic supply line, and die cushion pressure is controlled independently for each hydraulic cylinder (Japanese Utility Model Application Laid-Open No. 6-66822).

Since the die cushion pressure is controlled independently for each hydraulic cylinder, even if there are deviations in pin length among die cushion pins, the apparatus described in Japanese Utility Model Application Laid-Open No. 6-66822 can prevent degradation of stamping performance by eliminating the deviations and adjust stamping performance according to the shape of a formed object.

SUMMARY OF THE INVENTION

Although Japanese Utility Model Application Laid-Open No. 6-66822 describes how to control the die cushion pressure acting on each hydraulic cylinder by independently controlling the hydraulic pressure supplied to each hydraulic cylinder, via a pressure control valve, no mention is made of how to set plural die cushion pressures.

To individually set the die cushion forces acting on plural driving shafts, it is usually conceivable that an operator sets die cushion force on each driving shaft manually. In that case, however, when there are a large number of driving shafts to be configured, there is a problem in that the operation of setting the die cushion force individually on each driving shaft becomes troublesome. Also, there is a problem in that it is difficult to provide a precise distribution of die cushion forces in a plane of the cushion pad for a complex-shaped drawn part because it is difficult to apply a strong or weak die cushion force to a specifically shaped region of the complex-shaped drawn part and also because a total die cushion force acts discontinuously in the cushion pad due to inaccuracy of human sense.

The present invention has been made in view of the above circumstances and has an object to provide a die cushion force setting apparatus which, in individually setting die cushion forces (component forces) acting on plural driving shafts, allows the die cushion forces to be set easily, makes it easy to apply strong or weak die cushion forces to a complex-shaped drawn part in a plane of a cushion pad, and provides a smooth die cushion force distribution.

To achieve the above object, according to one aspect of the present invention, there is provided a die cushion force setting apparatus for a die cushion apparatus which includes a plurality of die cushion force generators adapted to support a cushion pad on a plurality of driving shafts and generate die cushion forces at positions of the plurality of driving shafts, respectively, a die cushion force command device adapted to output a plurality of die cushion force commands for the plurality of die cushion force generators, respectively, and a die cushion force controller adapted to control the plurality of die cushion force generators independently based on the plurality of die cushion force commands outputted from the die cushion force command device to cause the plurality of die cushion force generators to generate die cushion forces in response to respective die cushion force commands of the plurality of die cushion force commands, the die cushion force setting apparatus comprising: a first input device used to manually enter one die cushion force; a second input device used to manually enter additional information in order to numerically compute the plurality of die cushion forces in relation to the one die cushion force entered via the first input device; a computing device which numerically computes one or more of the plurality of die cushion forces based on the one die cushion force entered via the first input device and on the additional information entered via the second input device; and a die cushion force setting device which sets a plurality of die cushion forces including the one or more die cushion forces computed by the computing device as a plurality of die cushion force commands on the die cushion force command device.

According to the aspect of the present invention, when one die cushion force is entered via the first input device and additional information is entered via the second input device, the computing device numerically computes one or more of the plurality of die cushion forces based on the entered one die cushion force and additional information. Then, a plurality of die cushion forces including the one or more die cushion forces computed by the computing device are set as a plurality of die cushion force commands on the die cushion force command device. This makes it easier to enter die cushion forces than when all the plural die cushion forces are entered manually. Also, since one or more of the plural die cushion forces are numerically computed based on the one die cushion force and additional information, the plural die cushion forces can be associated with one another based on the additional information.

According to another aspect of the present invention, in the die cushion force setting apparatus, preferably the one die cushion force entered via the first input device is a total die cushion force, which is a sum total of the die cushion forces generated by respective die cushion force generators of the plurality of die cushion force generators, or one of the plurality of die cushion forces.

When the total die cushion force is entered via the first input device, the computing device numerically computes each of the plurality of die cushion forces and when one of the plurality of die cushion forces is entered via the first input device, the computing device numerically computes the rest of the plurality of die cushion forces.

According to still another aspect of the present invention, in the die cushion force setting apparatus, preferably the additional information entered via the second input device is information about a position (x1, y1) of a point on the cushion pad in a coordinate system whose origin is at a center of the cushion pad, whose X coordinate is a right-and-left direction, and whose Y coordinate is a front-andrear direction such that when the total die cushion force, which is the sum total of the die cushion forces generated by respective die cushion force generators of the plurality of die cushion force generators, is applied to the position (x1, y1) of the point, a moment around an axis X=x1 parallel to the Y-axis and a moment around an axis Y=y1 parallel to the X-axis, produced by die cushion forces at cushion pad mounting positions on the respective driving shafts of the plurality of die cushion force generators, will both be equal to 0. The position of the point is defined here as a center-of-force position.

Generally, the die cushion forces acting on the plurality of driving shafts supporting the cushion pad are set to be uniform, but when a complex-shaped drawn part or asymmetrically-shaped drawn part is formed, press performance can be improved by adjusting (setting) each of the plurality of die cushion forces according to the shape of the drawn part. In this case, although it is troublesome to set plural die cushion forces individually by trial-and-error based on human sense while repeating trial pressing, a center-of-force position can be entered intuitively and plural die cushion forces can be changed simultaneously by changing the center-of-force position. Also, since the plural die cushion forces, which are calculated by numerical computations, can be calculated such that the die cushion forces will not act discontinuously in the plane of the cushion pad.

According to still another aspect of the present invention, in the die cushion force setting apparatus, the plurality of driving shafts are two shafts or four shafts; and when the plurality of driving shafts are four shafts, the additional information entered via the second input device further contains information about one of the plurality of die cushion forces.

According to still another aspect of the present invention, in the die cushion force setting apparatus, the additional information entered via the second input device is information concerning an inclination of an imaginary straight line or imaginary plane passing through a center of a straight line or plane which links cushion pad mounting positions on the respective driving shafts of the plurality of die cushion force generators when heights of the imaginary straight line or imaginary plane at the respective cushion pad mounting positions on the driving shafts are associated with magnitudes of the die cushion forces at the respective cushion pad mounting positions on the driving shafts. This makes it possible to calculate plural die cushion forces varying in magnitude continuously from one to another in the plane of the cushion pad.

According to still another aspect of the present invention, in the die cushion force setting apparatus, the plurality of driving shafts are two shafts or four shafts; and the information concerning the inclination of the imaginary straight line or imaginary plane entered via the second input device is information indicating a slope or inclination angle of the imaginary straight line when the plurality of driving shafts are two shafts, and is information indicating a rotational direction of the imaginary plane and a slope or inclination angle of the imaginary plane when the plurality of driving shafts are four shafts. In this way, the information (additional information) indicating the slope or inclination angle of the imaginary straight line makes it possible to set plural die cushion forces, makes relationships among magnitudes of the set plural die cushion forces easy to understand, and allows a desired die cushion force to be set efficiently.

According to still another aspect of the present invention, the die cushion force setting apparatus further comprises a third input device used to manually enter each of the plurality of die cushion forces. This makes it possible to set the die cushion forces in a conventional manner as well.

According to still another aspect of the present invention, the die cushion force setting apparatus further comprises a display device which displays the plurality of die cushion forces computed by the computing device, by associating the plurality of die cushion forces with the cushion pad mounting positions on the respective driving shafts of the plurality of die cushion force generators. This allows computation results produced by the computing device to be seen visually, making it possible to reflect the computation results in operation of the first and second input devices.

According to still another aspect of the present invention, the die cushion force setting apparatus further comprises a die cushion force setting method selector used to select one of a plurality of die cushion force setting methods for setting the plurality of die cushion forces using the die cushion force setting device. This allows the operator to select one of the plural die cushion force setting methods and set plural die cushion forces by the selected die cushion force setting method.

According to still another aspect of the present invention, the die cushion force setting apparatus further comprises a die cushion position selector used to select one of a plurality of die cushion positions, wherein the die cushion force setting method selector allows one die cushion force setting method to be selected for each die cushion position selected by the die cushion position selector. This makes it possible to select a die cushion force setting method suitable for a die cushion position.

According to the present invention, in individually setting die cushion forces (component forces) acting on plural driving shafts, since one or more of the plural die cushion forces are numerically computed based on input of one die cushion force and additional information, it is easier to enter die cushion forces than when all the plural die cushion forces are entered manually. Also, since the plural die cushion forces can be associated with one another based on the additional information, it is easy to apply strong or weak die cushion forces to a complex-shaped drawn part in the plane of the cushion pad, making it possible to provide a smooth die cushion force distribution.

BRIEF DESCRIPTION OF THE DRAWINGS

FIG. 2 is a perspective view showing a cushion pad, four hydraulic cylinders, and the like;

DETAILED DESCRIPTION OF THE PREFERRED EMBODIMENTS

A preferred embodiment of a die cushion force setting apparatus according to the present invention will be described in detail below with reference to the accompanying drawings.

First, a die cushion apparatus of a press machine resulting from application of a die cushion force setting apparatus according to the present invention will be described.

<Structure of Press Machine>

Figure 1:
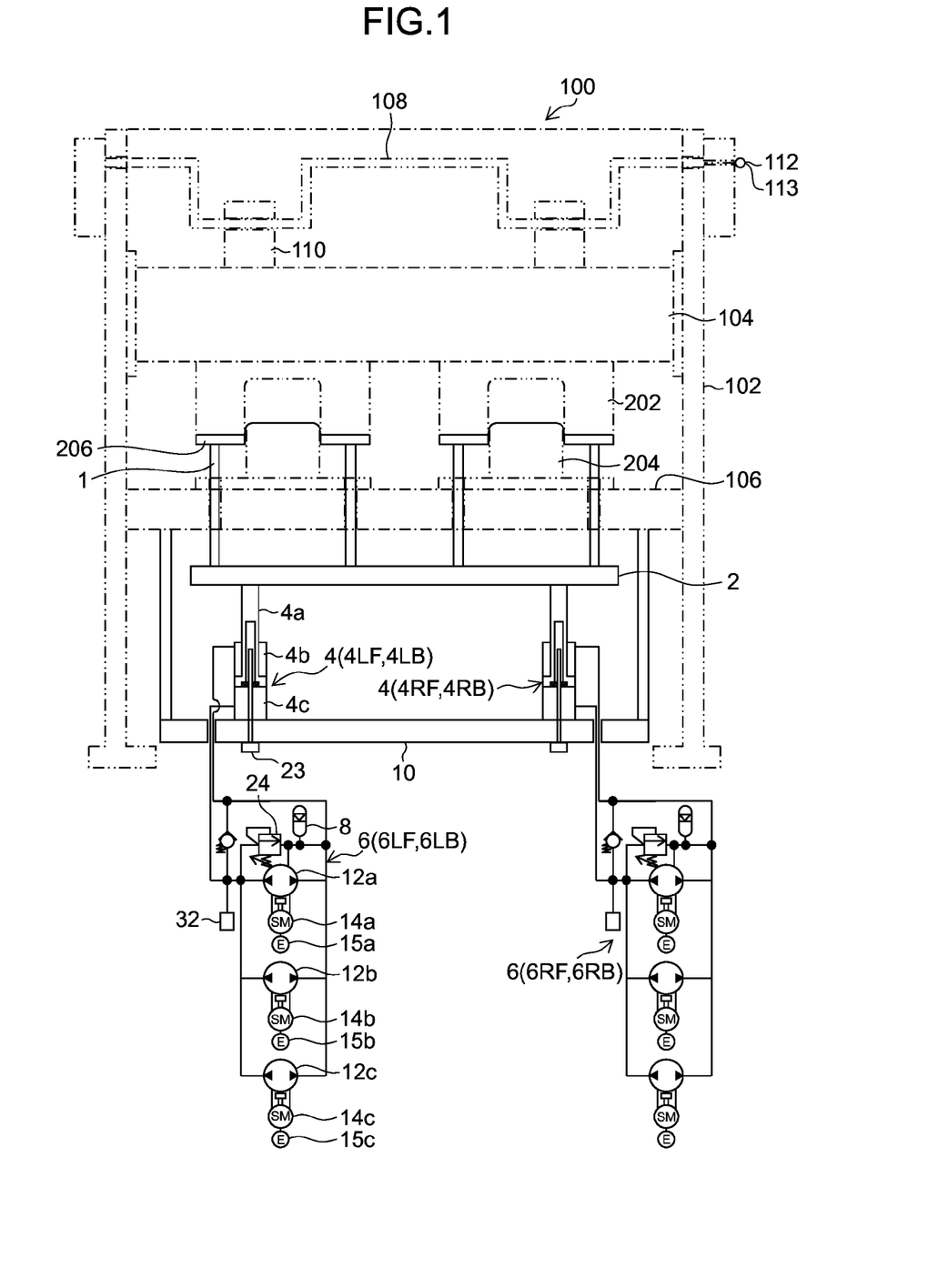
FIG. 1 is a configuration diagram showing an embodiment of a die cushion apparatus of a press machine.

FIG. 1 is a configuration diagram showing an embodiment of a die cushion apparatus of a press machine. Main components of the press machine are indicated by chain lines.

The press machine 100 shown in FIG. 1 includes a column (frame) 102, a slide 104, a bed 106, a crankshaft 108, and a connecting rod 110, and slide 104 is movably guided in a vertical direction by a guide unit installed on the column 102. Also, the crankshaft 108 is coupled to the slide 104 via the connecting rod 110. A rotational driving force is designed to be transmitted to the crankshaft 108 via a servomotor and reduction gear mechanism (neither is shown), and when the crankshaft 108 is rotated by the servomotor, the slide 104 is moved in an up-and-down direction in FIG. 1 by a driving force applied via the crankshaft 108 and connecting rod 110.

Also, the crankshaft 108 is provided with an angle sensor 112 which detects an angle of the crankshaft 108. An angular velocity signal can be acquired by differentiating an angle signal outputted from the angle sensor 112, but an angular velocity sensor may be installed separately.

An upper die 202 is mounted on a bottom face of the slide 104, and a lower die 204 is mounted on a top face of the bed 106. In the present example, dies (upper die 202 and lower die 204) are used to form a cup-shaped product closed at the top.

<Structure of Die Cushion Apparatus>

A die cushion apparatus 200 mainly includes a cushion pad 2, four hydraulic cylinders 4 (4LF, 4LB, 4RF, and 4RB) which support the cushion pad 2, four hydraulic circuits 6 (6LF, 6LB, 6RF, and 6RB) which drive the four hydraulic cylinders 4, respectively, and a die cushion force control apparatus 300 (FIG. 3) which controls the four hydraulic circuits 6 (6LF, 6LB, 6RF, and 6RB).

A blank holding plate 206 is installed between the upper die 202 and lower die 204. A bottom side of the blank holding plate 206 is supported by the cushion pad 2 via plural cushion pins 1 and a blank is placed (in contact) on a top side.

Figure 2:
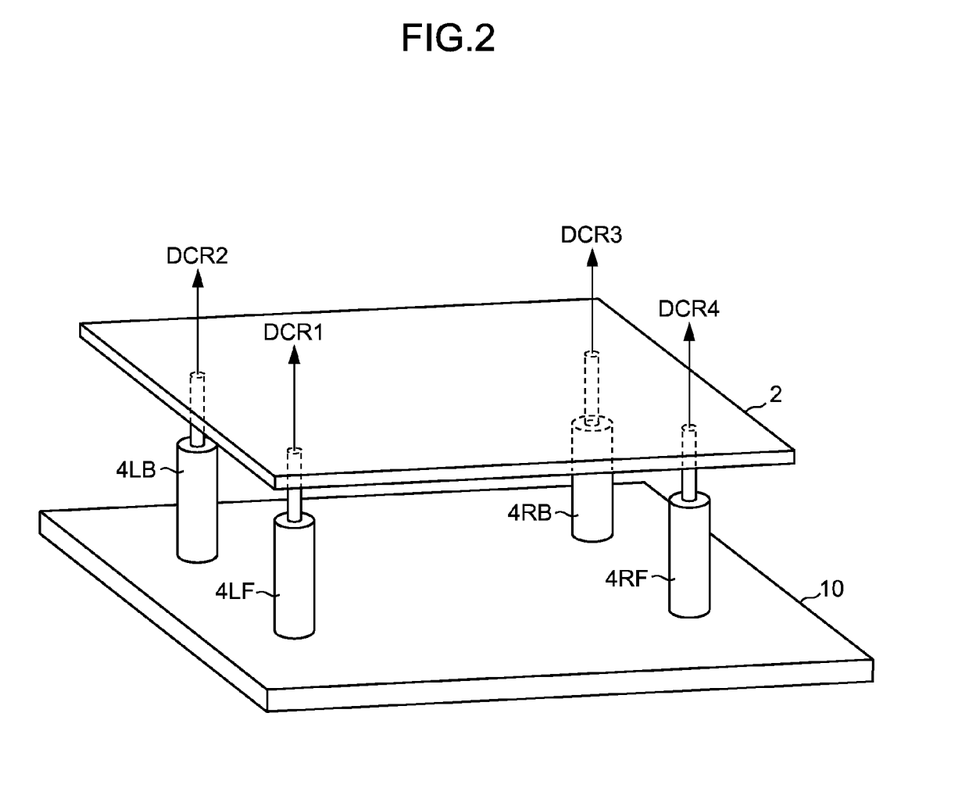

FIG. 2 is a perspective view showing the cushion pad 2, four hydraulic cylinders 4 (4LF, 4LB, 4RF, and 4RB), and the like. As shown in FIG. 2, the four hydraulic cylinders 4 (4LF, 4LB, 4RF, and 4RB) are disposed at four—front, back, left, and right—locations on a cushion base 10, and a tip of a piston rod (driving shaft) 4a of each hydraulic cylinder 4 is disposed at a set position on a bottom face of the cushion pad 2 (position at a corresponding apex of a rectangle on the bottom face of the cushion pad 2, in the present example). The four hydraulic cylinders 4 and hydraulic circuits 6 function as a cushion pad lifts which move the cushion pad 2 up and down and as die cushion force generators which generate die cushion forces on the cushion pad 2.

Also, each hydraulic cylinder 4 is provided with a die cushion position sensor 23 which detects a position of the piston rod 4a of the hydraulic cylinder 4 in an extension direction as a position of the cushion pad 2 in an up/down direction.

Note that the four hydraulic cylinders 4 have a same configuration, and so are the four hydraulic circuits 6. Also, the die cushion position sensor may be installed between the bed 106 and cushion pad 2.

Next, a configuration of the hydraulic circuits 6 adapted to individually drive the respective hydraulic cylinders 4 will be described.

The hydraulic circuit 6 includes an accumulator 8, hydraulic pumps/motors 12a, 12b, and 12c; electric servomotors 14a, 14b, and 14c connected to rotating shafts of the hydraulic pumps/motors 12a, 12b, and 12c; angular velocity sensors 15a, 15b, and 15c adapted to detect angular velocities of driving shafts of the electric servomotors 14a, 14b, and 14c, respectively; a relief valve 24; and a pressure sensor 32.

The accumulator 8, which is set to a low gas pressure, serves as a tank. One port of each hydraulic pump/motor 12a, 12b, or 12c is connected to a top side compression chamber (cushion pressure generating side compression chamber) 4c of the hydraulic cylinder 4 and another port is connected to the accumulator 8.

Note that the relief valve 24 is provided as a means of preventing breakage of hydraulic equipment by operating in case of abnormal pressure (sudden development of abnormal pressure rendering the die cushion force uncontrollable). Also, a bottom side compression chamber (pad side compression chamber) 4b of the hydraulic cylinder 4 is connected to the accumulator 8.

The pressure acting on the cushion pressure generating side compression chamber 4c of the hydraulic cylinder 4 is detected by the pressure sensors 32, and the angular velocities of the electric servomotors 14a, 14b, and 14c are detected by the angular velocity sensors 15a, 15b, and 15c, respectively.

[Principles of Die Cushion Force Control]

The die cushion force can be expressed by the product of the pressure in the cushion pressure generating side compression chamber 4c of each hydraulic cylinder 4 and cylinder area, and thus controlling the die cushion force means controlling the pressure in the cushion pressure generating side compression chamber of each hydraulic cylinder 4.

Now, parameters for one of the four hydraulic cylinders 4 are defined as follows.

A: Cross sectional area of hydraulic cylinder on die cushion force generating side V: Volume of hydraulic cylinder on die cushion force generating side P: Die cushion force Ta, Tb, Tc: Electric (servo) motor torques Ia, Ib and Ic: Moments of inertia of servomotors DMa, DMb, DMc: Viscous drag coefficients of electric motors fMa, fMb, fMc: friction torques of electric motors Qa, Qb, Qc: Swept volumes of hydraulic pumps/motors F: Force applied to hydraulic cylinder piston rod by slide v: Pad velocity generated when pad is pushed by press M: Inertial mass of hydraulic cylinder piston rod plus pad DS: Viscous drag coefficient of hydraulic cylinder fS: Frictional force of hydraulic cylinder ωa, ωb, ωc: Angular velocities of servomotors rotating by being pushed by pressure oil
K: Bulk modulus of hydraulic fluid
k1, k2: Proportionality factors Static behavior can be expressed by mathematical formulae 1 and 2 below.

$$P = \int K((v \cdot A - k1(Qa \cdot \omega a + Qb \cdot \omega b + Qc \cdot \omega c))/V) dt$$
[Mathematical formula 1]

$$Ta = k2 \cdot PQa/(2\pi), \ Tb = k2 \cdot PQb/(2\pi''), \ Tc = k2 \cdot PQc/(2\pi)$$
[Mathematical formula 2]

Also, dynamic behavior can be expressed by mathematical formulae 3 and 4 in addition to mathematical formulae 1 and 2.

$$PA - F = M \cdot dv/dt + DS \cdot v + fS$$
[Mathematical formula 3]

$$Ta - k2 \cdot PQa/(2\pi) = Ia \cdot d\omega a/dt + DMa \cdot \omega a + fMa$$

$$Tb - k2 \cdot PQb/(2\pi) = Ib \cdot d\omega b/dt + DMb \cdot \omega b + fMb$$

$$Tc - k2 \cdot PQc/(2\pi) = Ic \cdot d\omega c/dt + DMc \cdot \omega c + fMc$$ [Mathematical formula 4]

Mathematical formulae 1 to 4 above mean that the force transmitted from the slide 104 to the hydraulic cylinder 4 via the cushion pad 2 compresses the cushion pressure generating side compression chamber of the hydraulic cylinder 4 and thereby generates die cushion pressures. At the same time, the hydraulic pumps/motors 12a, 12b, and 12c are caused to operate as hydraulic motors by the die cushion pressures, and when rotating shaft torques generated on the hydraulic pumps/motors 12a, 12b, and 12c counteract driving torques of the electric servomotors 14a, 14b, and 14c, the electric servomotors 14a, 14b, and 14c are rotated (regenerative action) to curb pressure increases.

After all, the die cushion force generated by the hydraulic cylinders 4 depend on the driving torques of the electric servomotors 14a, 14b, and 14c. Therefore, the die cushion forces generated on the cushion pad 2 are determined, respectively, by controlling the driving torques of the electric servomotors 14a, 14b, and 14c in the four hydraulic circuits 6 which drive the respective hydraulic cylinders 4.

The die cushion apparatus 200 is switched to die cushion position control when the slide position converted from the crank angle detected by the angle sensor 112 is located in a zone between a top dead center and a position where a bottom face of the upper die 202 impacts against the blank and in a non-machining zone between a bottom dead center and the top dead center, and switched to die cushion force control when the slide position is located in a machining zone between a position where the bottom face of the upper die 202 impacts against the blank and the bottom dead center.

Die cushion force control in the machining zone will be described, and description of the die cushion position control in the non-machining zone will be omitted.

[Die Cushion Force Control Apparatus]

Figure 3:
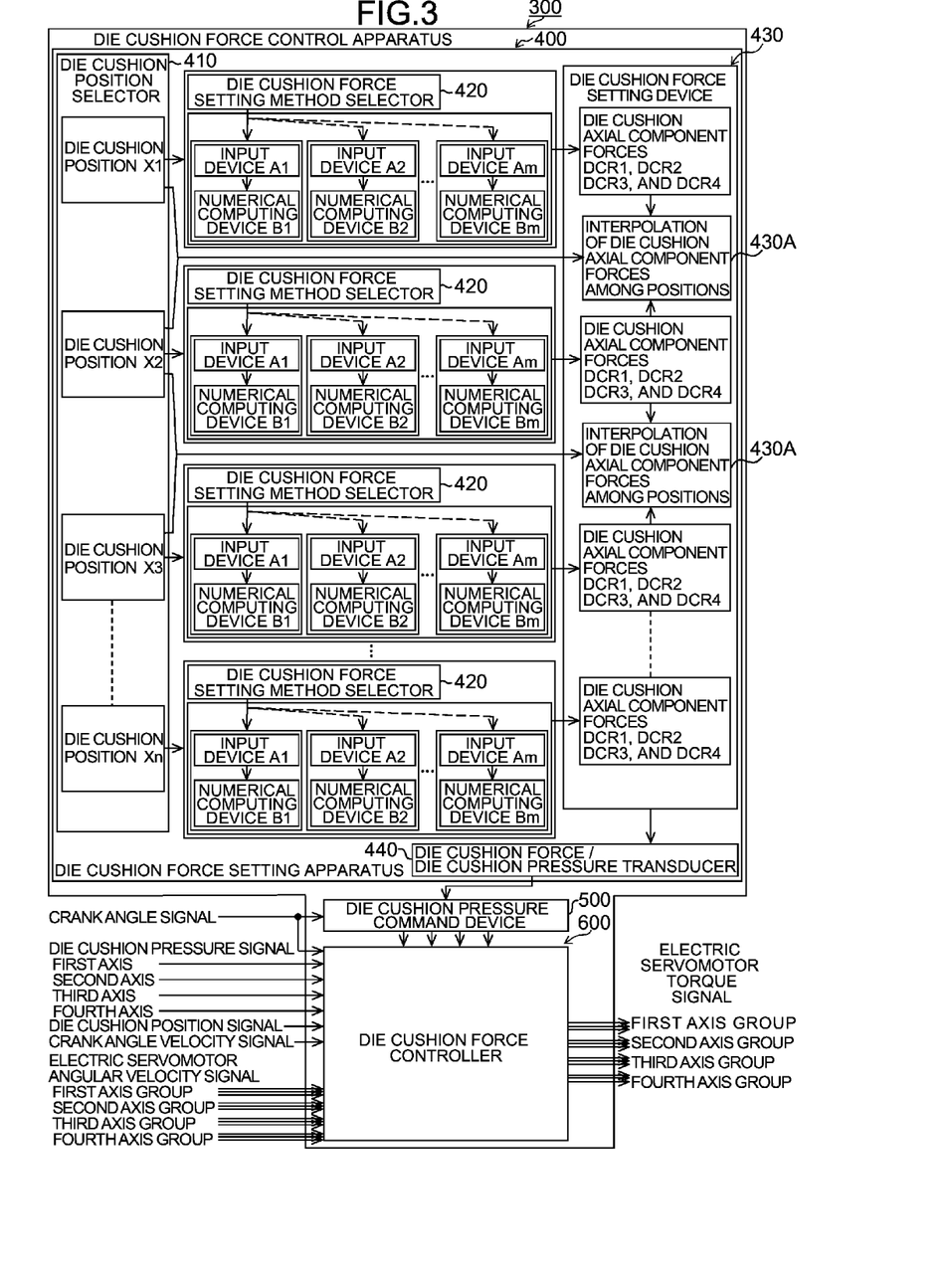
FIG. 3 is a block diagram showing an embodiment of a die cushion force control apparatus in the die cushion apparatus shown in FIG. 1.

FIG. 3 is a block diagram showing an embodiment of the die cushion force control apparatus 300 in the die cushion apparatus 200 shown in FIG. 1.

The die cushion force control apparatus 300 shown in FIG. 3 mainly includes a die cushion force setting apparatus 400 according to the present invention, a die cushion pressure command device (die cushion force command device) 500, and a die cushion force controller 600.

The die cushion force setting apparatus 400 includes a die cushion position selector 410; die cushion force setting method selectors 420-1, 420-2, 420-3, . . . , 420-n; input devices A1, A2, . . . , Am; numerical computing devices B1, B2, . . . , Bm; a die cushion force setting device 430; and a die cushion force/die cushion pressure transducer 440.

The die cushion position selector 410 is a part adapted to accept selection of a die cushion position (initial position) X1, die cushion positions (pressure changing positions) X2, X3, . . . , Xn, in a machining zone between the position where the bottom face of the upper die 202 impacts against the blank and the bottom dead center, and input of position information about the selected die cushion position.

Figure 4:
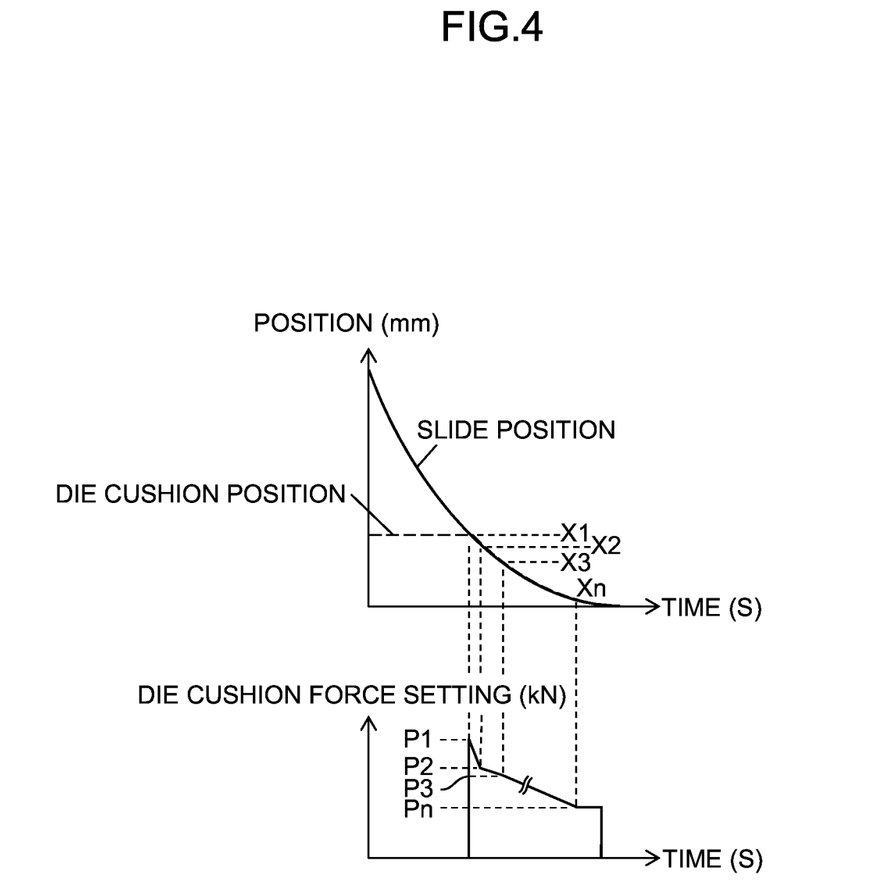
FIG. 4 is a graph showing an example of die cushion forces set according to die cushion positions.

FIG. 4 shows plural die cushion positions X1, X2, X3, . . . , Xn set according to the position of the slide 104. Using the die cushion position selector 410, the operator can select a die cushion position (initial position X1 and pressure changing positions X2, X3, . . . ) and enter position information about the selected die cushion position.

The die cushion force setting method selectors 420 (420-1, 420-2, 420-3, . . . , and 420-n), each of which is a part adapted to accept selection of one of plural die cushion force setting methods (setting methods 1, 2, . . . , and m), are installed for the respective die cushion positions X1, X2, X3, . . . , and Xn. Using the die cushion force setting method selectors 420, the operator can select one of the die cushion force setting methods 1, 2, . . . , and m for each die cushion position. The input devices A (A1, A2, . . . Am) and numerical computing devices B (B1, B2, . . . , Bm) correspond to the die cushion force setting methods 1, 2, . . . , and m. For example, when the die cushion force setting method 1 is selected using the die cushion force setting method selector 420, the input device A1 and numerical computing device B1 are selected and used to determine plural die cushion forces (axial component forces DCR1 to DCR4 (see FIG. 2) on the four hydraulic cylinders 4, in the present example) based on the die cushion force setting method 1.

The input device A includes a first input device used to manually enter one die cushion force, a second input device used to manually enter additional information, and a third input device used to manually enter each of the four die cushion forces, and the numerical computing device B numerically computes plural die cushion forces based on the die cushion force and additional information entered via the input device A.

Details of the input device A and numerical computing device B (i.e., plural die cushion force setting methods 1, 2, . . . , and m) will be described later.

The die cushion force setting device 430 has an interpolation computing device 430A, and accepts input of axial component forces DCR1 to DCR4 calculated for each of the die cushion positions X1, X2, . . . , and Xn from the numerical computing device B as well as input of position information about the die cushion positions X1, X2, . . . , and Xn from the die cushion position selector 410. Then, the interpolation computing device 430A carries out interpolation computations of the axial component forces DCR1 to DCR4 based on the axial component forces DCR1 to DCR4 calculated for each of the die cushion positions X1, X2, . . . , and Xn as well as on the position information about the die cushion positions X1, X2, . . . , and Xn and calculates the axial component forces DCR1 to DCR4 which change continuously according to the die cushion position.

As shown in FIG. 4, if the axial component forces on a certain driving shaft at the die cushion positions X1, X2, X3, . . . and Xn are P1, P2, P3, . . . and Pn, the interpolation computing device 430A calculates axial component forces among the axial component forces P1, P2, P3, . . . , and Pn using linear interpolation according to the die cushion positions.

The axial component forces DCR1 to DCR4 set by the die cushion force setting device 430 according to the die cushion positions are outputted to the die cushion force/die cushion pressure transducer 440. The die cushion force/die cushion pressure transducer 440 converts the die cushion forces (axial component forces DCR1 to DCR4) into die cushion pressures, by dividing the die cushion forces by a cross sectional area A of the hydraulic cylinder 4 on the die cushion force generating side. The die cushion pressures converted from the axial component forces DCR1 to DCR4 by the die cushion force/die cushion pressure transducer 440 are set on the die cushion pressure command device 500 as die cushion pressure commands for the respective hydraulic cylinders 4.

A crank angle signal is applied to another input of the die cushion pressure command device 500 from the angle sensor 112 adapted to detect the angle of the crankshaft, and the die cushion pressure command device 500 outputs a die cushion pressure command for each hydraulic cylinder 4 to the die cushion force controller 600 based on the slide position computed from the crank angle signal.

Another input of the die cushion force controller 600 is supplied with die cushion pressure signals from the pressure sensor 32, indicating pressures acting on the cushion pressure generating side compression chambers 4c of the respective hydraulic cylinders 4, with angular velocity signals from the angular velocity sensors 15a, 15b, and 15c, indicating angular velocities of the electric servomotors 14a, 14b, and 14c in the hydraulic circuits 6 which drive the respective hydraulic cylinders 4, and with the angle and angular velocity of the crankshaft, which are used to compute slide velocity, from the angle sensor 112 and 113. Then, the die cushion force controller 600 outputs torque commands for the electric servomotors 14a, 14b, and 14c of the respective hydraulic circuits 6 by computing the torque commands from the inputted die cushion force commands for respective axes, the die cushion pressure signals, the angular velocity signals indicating the angular velocities of the electric servomotors, and a slide velocity signal computed using the inputted angle and angular velocity of the crankshaft.

Torque commands for the respective electric servomotors 14a, 14b, and 14c are outputted from the die cushion force controller 600 and transmitted to the electric servomotors 14a, 14b, and 14c of the respective hydraulic circuits 6 via an amplifier (not shown). This makes it possible to perform pressure control (die cushion force control) of the cushion pressure generating side compression chambers 4c of the four—front, back, left, and right—hydraulic cylinders 4 individually.

[Die Cushion Force Setting Method]

Next, a die cushion force setting method set by the die cushion force setting apparatus 400 of the above configuration will be described.

Figure 5:
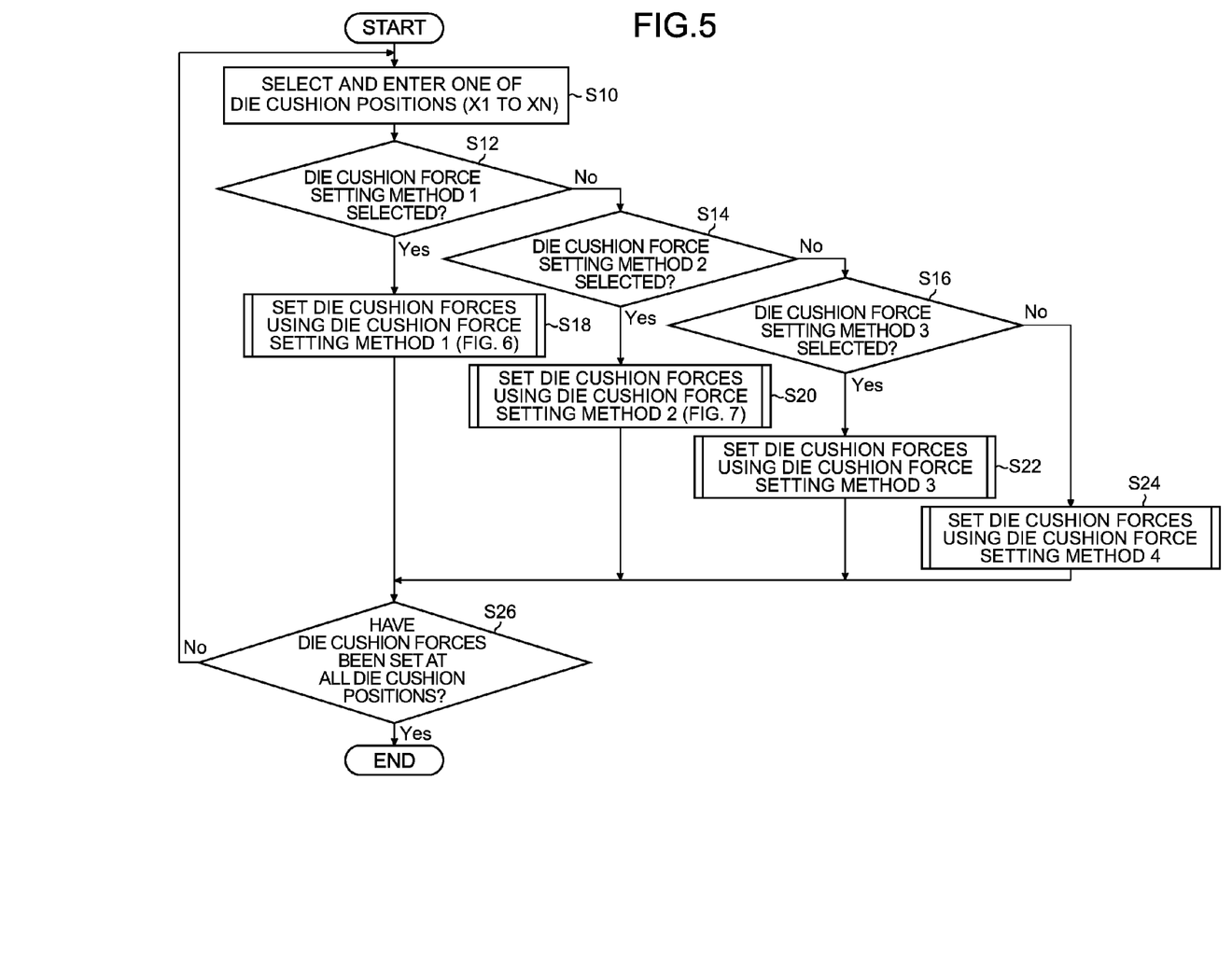
FIG. 5 is a flowchart showing an embodiment of a die cushion force setting method set by a die cushion force setting apparatus.

FIG. 5 is a flowchart showing an embodiment of the die cushion force setting method set by the die cushion force setting apparatus 400.

In FIG. 5, first the operator selects one die cushion position from plural die cushion positions (X1 to Xn) using the die cushion position selector 410 and enters position information which represents the selected die cushion position (step S10).

Next, the operator selects one die cushion force setting method from plural die cushion force setting methods (setting methods 1, 2, . . . , and m) using the die cushion force setting method selector 420 (step S12, S14, or S16). In the present example, one of the four die cushion force setting methods 1 to 4 is selected in steps S12, S14, and S16.

In step S18, inputs are made using the selected die cushion force setting method 1, followed by a numerical computation process.

Figure 6:
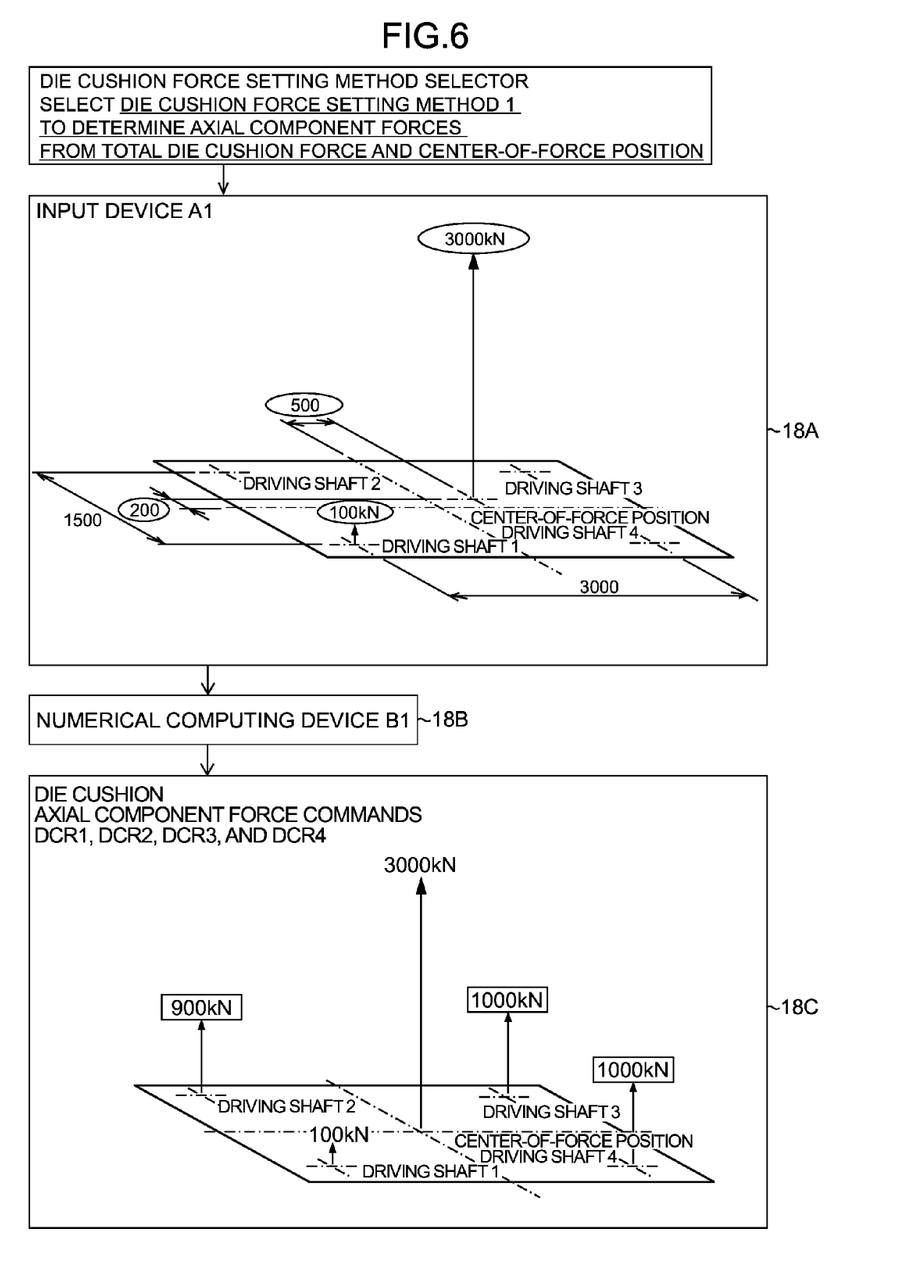
FIG. 6 is a diagram showing an example of inputs for die cushion force setting by a die cushion force setting method 1, followed by a numerical computation process.

FIG. 6 is a diagram showing an example of inputs for die cushion force setting by the die cushion force setting method 1, followed by a numerical computation process.

With the die cushion force setting method 1, the operator manually enters a total die cushion force and center-of-force position (additional information) by operating the input device A1 (step S18A).

Here, the total die cushion force is a sum total of the axial component forces DCR1 to DCR4 (see FIG. 2) on the four hydraulic cylinders 4 while the center-of-force position is a position of such a point on the cushion pad 2 that when the total die cushion force is applied to the position (x1, y1) of the point on the cushion pad 2 in a coordinate system whose origin is at a center of the cushion pad 2, whose X coordinate is a right-and-left direction, and whose Y coordinate is a front-and-rear direction, the total die cushion force at the position of the point will be equivalent to the die cushion forces (axial component forces) at cushion pad 2 mounting positions on the respective driving shafts of the four hydraulic cylinders 4, i.e., the position of such a point at which a moment around an axis X=x1 parallel to the Y-axis and a moment around an axis Y=y1 parallel to the X-axis, produced by the axial component forces, will both be equal to 0.

In the example of FIG. 6, 3000 kN is entered as the total die cushion force while x1=500 mm and y1=200 mm are entered as the center-of-force position (x1, y1). The center-of-force position (x1, y1) is a position in the coordinate system whose origin is at the center of the cushion pad 2, whose X coordinate is the right-and-left direction, and whose Y coordinate is the front-and-rear direction. Also, a distance between the driving shafts of the hydraulic cylinders 4 in the right-and-left direction of the cushion pad 2 is 3000 mm and a distance between the driving shafts of the hydraulic cylinders 4 in the front-and-rear direction is 1500 mm Furthermore, in the example of FIG. 6, 100 kN is entered as the axial component force of the left front hydraulic cylinder 4LF via the input device A1. The axial component force is entered because the four axial component forces cannot be calculated from only the total die cushion force, center-of-force position (x1, y1), and positions of the driving shafts through computations. Note that the axial component force entered via the input device A1 is not limited to the left front axial component force, and one of four axial component forces may be selected and entered. Note that it is sufficient (satisfactory) if the one axial component force is a value which is within a certain range, and the remaining three axial component forces are determined accordingly. Therefore, there is a method which sets the axial component force at any of the positions (e.g., left front position) automatically to a tentative value (reference value), calculates the other axial component forces directly if the tentative value holds good, or otherwise calculates the other axial component forces only after making the tentative value hold good by increasing or decreasing the value.

For example, in the present example (total die cushion force=3000 kN, x1=500 mm, y1=200 mm), only 100 kN holds good as the axial component force of the hydraulic cylinder 4LF, but any value larger or smaller than 100 kN does not hold good because the axial component force RB or RF exceeds a maximum set value of 1000 kN for one axis.

However, in another example (total die cushion force=3000 kN, x1=200 mm, y1=200 mm), it is satisfactory if one axial component force falls within a range of 300 and 400 kN because all the other axial component forces are equal to or smaller than the maximum set value of 1000 kN for one axis.

Based on the total die cushion force (3000 kN), center-of-force position (500, 200), and axial component force of the left front hydraulic cylinder 4LF (100 kN) which have been entered via the input device A1, the numerical computing device B1 calculates the axial component forces of the other three hydraulic cylinders 4 (4LB, 4RF, and 4RB) through computations (step S18B).

That is, the axial component forces of the other three hydraulic cylinders 4 (4LB, 4RF, and 4RB) can be numerically computed based on conditions that the sum total of the four axial component forces will be 3000 kN and that moments around axes which intersect each other at the center-of-force position (500, 200), i.e., a moment around an axis X=500 parallel to the Y-axis and a moment around an axis Y=200 parallel to the X-axis, will both be equal to 0. In the present example, the axial component forces (DCR2 to DCR4) of the three hydraulic cylinders 4 are calculated as 900 kN, 1000 kN, and 1000 kN, respectively.

The one axial component force thus entered and three axial component forces thus computed numerically are set as the axial component forces DCR1 to DCR4 of the four hydraulic cylinders 4 (step S18C).

Returning to FIG. 5, in step S20, inputs for die cushion force setting are made using a selected die cushion force setting method 2, followed by a numerical computation process.

Figure 7:
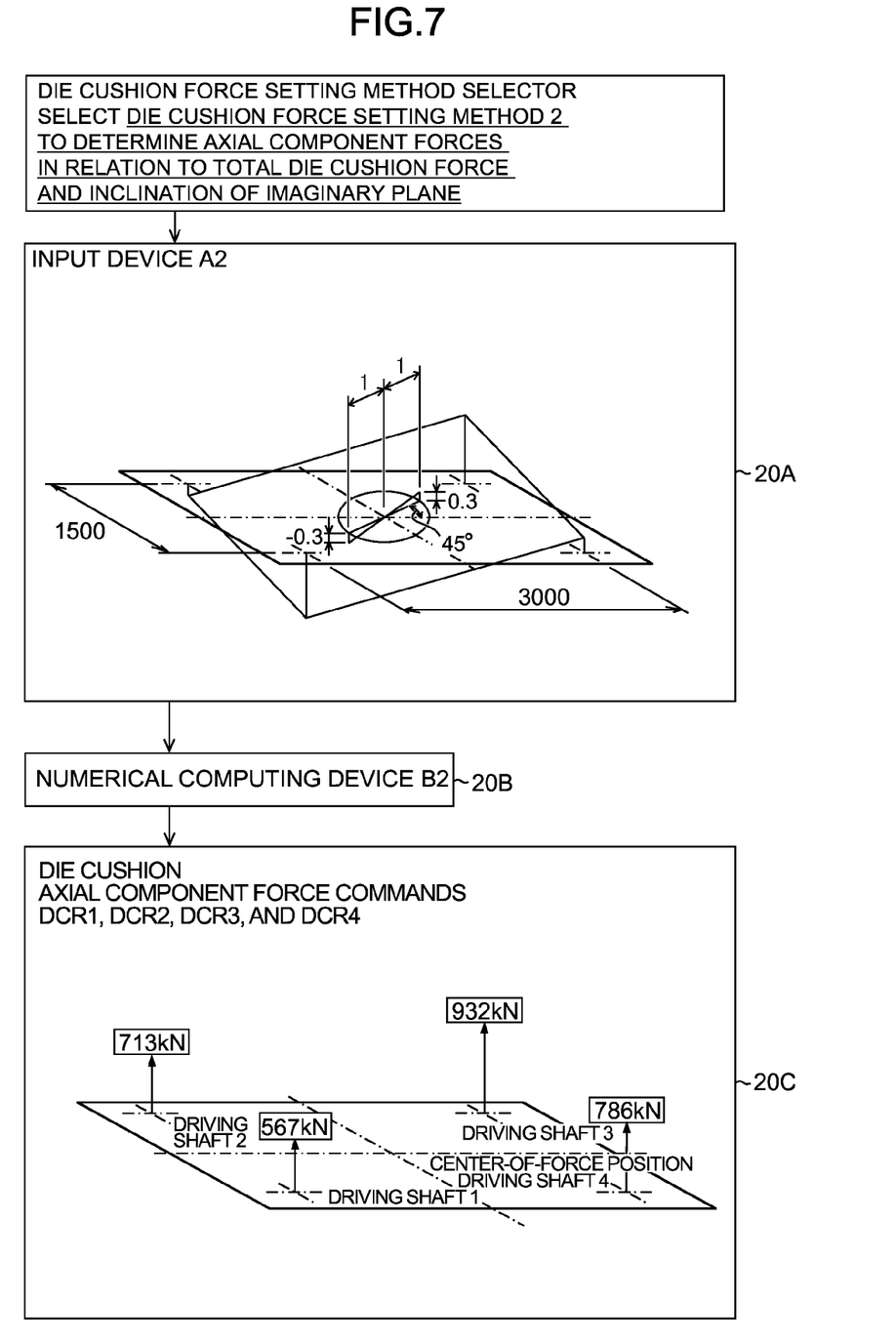
FIG. 7 is a diagram showing an example of inputs for die cushion force setting by a die cushion force setting method 2, followed by a numerical computation process.

FIG. 7 is a diagram showing an example of inputs for die cushion force setting by the die cushion force setting method 2, followed by a numerical computation process.

With the die cushion force setting method 2, the operator manually enters a total die cushion force and information concerning an inclination of an imaginary plane (additional information) by operating the input device A2 (step S20A).

Here, the imaginary plane is a virtual plane which passes through a center of a plane linking cushion pad 2 mounting positions on the respective driving shafts of the four hydraulic cylinders 4 and inclines in all directions from the center, with heights of the cushion pad 2 mounting positions on the driving shafts of the four hydraulic cylinders 4 being associated with magnitudes of the respective axial component forces on the driving shafts. In other words, the imaginary plane is a plane obtained by linking tips of axial number lines which represent the magnitudes of the axial component forces at the respective cushion pad 2 mounting positions on the driving shafts.

In the example shown in FIG. 7, 3000 kN is entered as the total die cushion force. Also, assuming a unit circle included in an imaginary plane with a radius of 1 mm, a rotational direction (45°) and slope of the imaginary plane are entered as information concerning the inclination of the imaginary plane, where the slope is given as a height (0.3 mm) at a circumferential position of the unit circle on the imaginary plane in the rotational direction of the imaginary plane. Note that an inclination angle may be entered instead of the slope. The rotational direction of the imaginary plane is a direction obtained when a direction from a center of the unit circle toward the highest circumferential position of the unit circle is projected onto the plane linking the cushion pad mounting positions on the driving shafts of the hydraulic cylinder.

Also, it is assumed that heights of the imaginary plane (plane obtained by extending the unit circle) at cushion pad 2 mounting positions on the driving shafts of the four hydraulic cylinders 4 as well as correlations of the driving shafts with the respective die cushion forces have been set in advance.

The numerical computing device B2 calculates the axial component forces of the four hydraulic cylinders 4 through computations based on the total die cushion force (3000 kN) entered via the input device A1, information concerning the inclination of the imaginary plane (height (0.3 mm) in a rotational direction of 45° on a unit circle with a radius of 1 mm), heights of the imaginary plane at the cushion pad 2 mounting positions, and correlations of the driving shafts with the respective die cushion forces (step S20B). In the present example, the axial component forces DCR1 to DCR4 of the four hydraulic cylinders 4 are calculated as 567 kN, 713 kN, 932 kN, and 786 kN, respectively.

The four axial component forces numerically computed in this way are set as the axial component forces DCR1 to DCR4 of the four hydraulic cylinder 4 (step S20C).

Although with the die cushion force setting method 2 described above, the total die cushion force is designed to be entered, this is not restrictive, and one of the axial component forces DCR1 to DCR4 of the four hydraulic cylinders 4 may be designed to be entered. Also, instead of a preset die cushion force per unit length, one of the axial component forces DCR1 to DCR4 of the four hydraulic cylinders 4 may be designed to be entered.

Returning to FIG. 5, in step S22, inputs for die cushion force setting are made using a selected die cushion force setting method 3, followed by a numerical computation process.

With the die cushion force setting method 3, when the total die cushion force is entered, numerical computations are carried out such that the axial component forces DCR1 to DCR4 of the four hydraulic cylinders 4 will be equal to one another and computation results are set as the axial component forces DCR1 to DCR4 of the four hydraulic cylinders 4. Note that one axial component force may be entered instead of entering the total die cushion force. In that case, the other axial component forces are set equal to the entered axial component force.

In step S24, inputs and the like are made for die cushion force setting according to the selected die cushion force setting method 4.

The die cushion force setting method 4 is selected to manually set each of the axial component forces DCR1 to DCR4 of the four hydraulic cylinders 4.

When a die cushion force is set by the die cushion force setting method selected as described above, it is determined whether or not die cushion forces have been set at all the die cushion positions (step S26). If it is determined that die cushion forces have not been set at all the die cushion positions, the flow goes to step S10, where a die cushion position is selected and entered and a die cushion force is set by the selected die cushion force setting method. When die cushion forces have been set at all the die cushion positions, the die cushion force setting is finished.

Generally, trial pressing is done on a press machine until a conforming article is press-formed, and press performance can be improved by adjusting (setting) each of the plurality of die cushion forces. In this case, in setting die cushion forces using the die cushion force setting method 1 or 2, settings of plural die cushion forces can be changed easily by changing the total die cushion force or by changing the center-of-force position or the rotational direction, slope, or the like of the imaginary plane as appropriate.

[Operation Panel Used for Die Cushion Force Setting Method]

Next, an embodiment of an operation panel (user interface) of the die cushion force setting apparatus 400 will be described, where the operation panel includes the die cushion position selector 410, die cushion force setting method selector 420, and input devices A (A1, A2, . . . , Am).

Figure 8A:
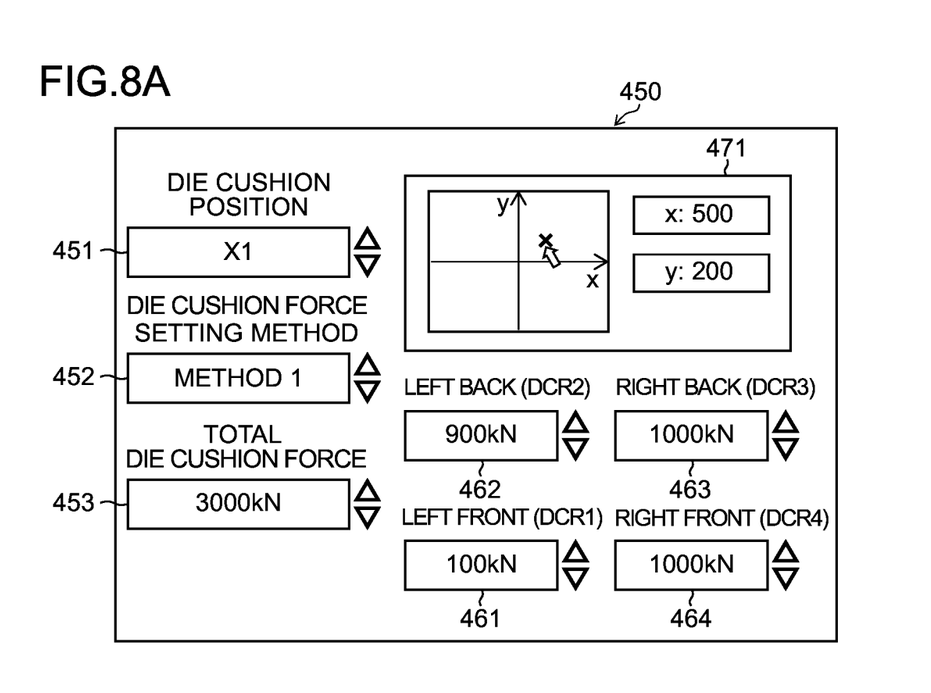
FIGS. 8A and 8B are diagrams each showing an example of an operation screen of an operation panel.
Figure 8B:
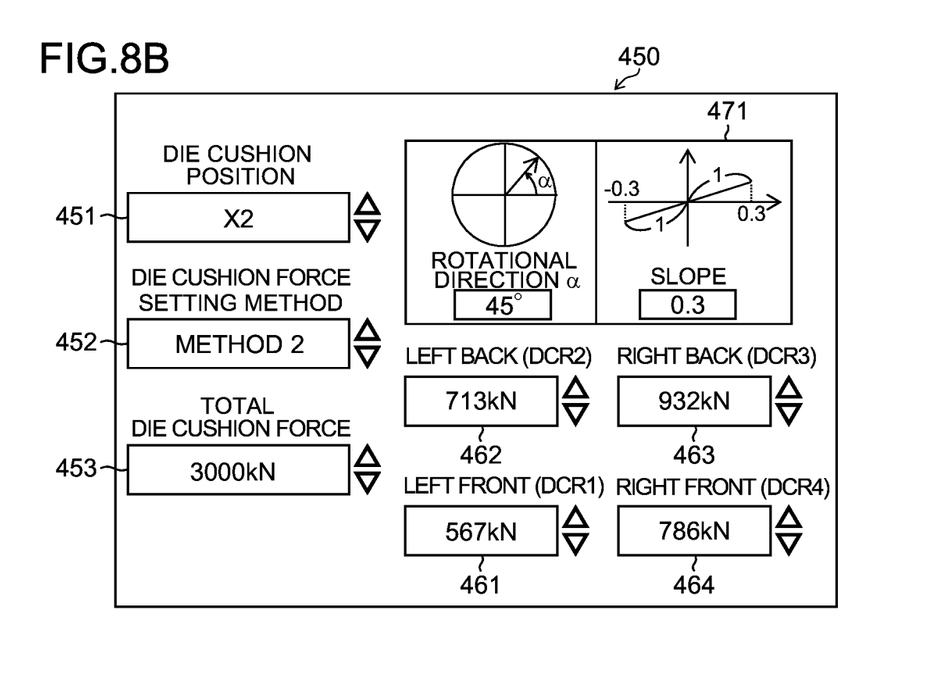

FIGS. 8A and 8B are diagrams each showing an example of an operation screen of the operation panel.

The operation panel includes a display device, a keyboard, and a mouse (none is shown), where the display device contains an operation screen 450.

The operation screen 450 contains, a die cushion position display area 451, a die cushion force setting method display area 452, a total die cushion force display area 453, front-, back-, left-, and right-axial component force display areas 461 to 464, and an additional information display area 471 corresponding to the die cushion force setting method as well as software buttons such as Up/Down keys (U/D keys).

Using the operation screen 450, soft buttons, and keyboard, the operator enters information needed in order to set the axial component forces DCR1 to DCR4 of the four hydraulic cylinders 4.

On the operation screen 450 shown in FIG. 8A, the die cushion position X1 (initial position) has been selected and entered using the die cushion position display area 451 and the die cushion force setting method 1 has been selected using the die cushion force setting method display area 452.

The die cushion force setting method 1 involves numerically computing and setting each of the axial component forces DCR1 to DCR4 of the four hydraulic cylinders 4 when the total die cushion force and center-of-force position (additional information) are entered as described above. In the example shown in FIG. 8A, the total die cushion force (3000 kN) is entered using the total die cushion force display area 453 and the center-of-force position (x1, y1) is entered using the additional information display area 471. Note that conceivable methods for entering the center-of-force position (x1, y1) include an input method which involves dragging the center-of-force position (X mark) displayed on the display area 471 to a desired location and an input method which involves entering numeric values of coordinates of the center-of-force position. Also, in the example shown in FIG. 8A, 100 kN is provided automatically in the left front display area 461 as an axial component force (DCR1) of the left front hydraulic cylinder such that DCR1 to DCR4 calculated sequentially based on the reference value of DCR1 will hold good (fall between upper and lower permissible limits).

The axial component forces DCR2, DCR3, and DCR4 of the hydraulic cylinders are numerically computed based on the entered information and computation results are displayed on the axial component force display areas 462, 463, and 464. Subsequently, if any one of DCR1 to DCR4 is changed manually via the display areas 461 to 464, the remaining three axial component forces are determined based on the change. (If the changes do not hold good, a message to that effect is displayed in another area (not shown) of the screen and the DCR1 to DCR4 before the manual change are retained (maintained).)

Consequently, by entering the total die cushion force and center-of-force position, the operator can set the axial component forces DCR1 to DCR4 of the four hydraulic cylinders 4. In particular, the operator can adjust the magnitudes of the four axial component forces DCR1 to DCR4 by setting the center-of-force position intuitively and adjust the axial component forces DCR1 to DCR4 such that the die cushion force will not act discontinuously in the plane of cushion pad 2.

Also, after setting the four axial component forces DCR1 to DCR4 once, each of the axial component forces DCR1 to DCR4 can be modified/changed easily by changing the total die cushion force or center-of-force position.

On the operation screen 450 shown in FIG. 8B, the die cushion position X2 has been selected and entered using the die cushion position display area 451 and the die cushion force setting method 2 has been selected using the die cushion force setting method display area 452.

The die cushion force setting method 2 involves numerically computing and setting each of the axial component forces DCR1 to DCR4 of the four hydraulic cylinders 4 when the total die cushion force and information concerning the inclination of the imaginary plane (additional information) are entered as described above. In the example shown in FIG. 8B, the total die cushion force (3000 kN) is entered using the total die cushion force display area 453 and the rotational direction $\alpha$ (45°) and slope (0.3) of the imaginary plane are entered using the additional information display area 471. Note that conceivable methods for entering the rotational direction $\alpha$ of the imaginary plane include an input method which involves dragging an arrow which, being displayed on the display area 471, indicates the rotational direction $\alpha$ and rotating the arrow in a desired direction and a method which involves entering numeric values of the rotational direction $\alpha$. Also, conceivable methods for entering the slope of the imaginary plane include an input method which involves dragging a line segment which indicates a slope and rotating the line segment to a desired slope (inclination) and an input method which involves entering numeric values of the slope.

The axial component forces DCR1 to DCR4 of the hydraulic cylinders 4 are numerically computed based on the entered information, and computation results are displayed on the axial component force display areas 461 to 464.

Consequently, by entering the total die cushion force as well as the rotational direction and slope of the imaginary plane, the operator can set the axial component forces DCR1 to DCR4 of the four hydraulic cylinders 4. In particular, the operator can adjust the magnitudes of the four axial component forces DCR1 to DCR4 by setting the rotational direction and slope of the imaginary plane intuitively and adjust the axial component forces DCR1 to DCR4 such that the die cushion force will not act discontinuously in the plane of the cushion pad 2.

Also, after setting the four axial component forces DCR1 to DCR4 once, the axial component forces DCR1 to DCR4 can be modified/changed easily by changing the total die cushion force or by changing the rotational direction and slope of the imaginary plane.

The operation panel equipped with the operation screen 450 enables die cushion force setting based on the above-described die cushion force setting method 3 or 4 as well.

[Others]

Although in the die cushion apparatus according to the above embodiments, hydraulic cylinders are disposed at four—front, back, left, and right—locations of the cushion pad, the die cushion force setting apparatus according to the present invention is also applicable to a die cushion apparatus in which hydraulic cylinders are disposed at two—left and right—locations.

In that case, to enter the center-of-force position (additional information) based on the die cushion force setting method 1, the center-of-force position is specified at two locations on a line segment linking the axes of the hydraulic cylinders. Also, to enter information concerning the inclination of the imaginary plane (additional information) based on the die cushion force setting method 2, the slope of a straight line (imaginary straight line) linking the axes of the hydraulic cylinders is specified at two locations.

Also, the present invention is not limited to the die cushion force setting apparatus which sets plural die cushion forces using any of the die cushion force setting methods described above, and die cushion force setting apparatus are conceivable which set plural die cushion forces using any of various die cushion force setting methods. In short, the present invention is applicable to any die cushion force setting apparatus which sets plural die cushion forces using a die cushion force setting method which numerically computes one or more die cushion forces based on at least one die cushion force and additional information entered manually.

Furthermore, although in the above embodiments, hydraulic cylinders are used as die cushion force generators which generate die cushion forces on the cushion pad of the die cushion apparatus, the present invention is applicable not only to the die cushion apparatus which use hydraulic cylinders, but also to die cushion apparatus which use other types of die cushion force generator. For example, the present invention is also applicable to a die cushion apparatus which controls die cushion forces by driving plural ball screw mechanisms using respective electric servomotors, the plural ball screw mechanisms being disposed in the cushion pad.

Furthermore, the present invention is not limited to the examples described above, and needless to say, various modifications and changes can be made without departing from the sprit and scope of the present invention.

What is claimed is:

1. A die cushion apparatus comprising:
   a cushion pad supported by drive shafts;
   die cushion force generators coupled to the drive shafts, respectively, and configured to generate die cushion forces at positions of the cushion pad, respectively, each position of which is supported by corresponding one of the driving shafts which is coupled to corresponding one of the die cushion force generators;
   a first input device configured to receive one die cushion force;
   a second input device configured to receive additional information in order to numerically compute the die cushion forces to be generated at the positions of the cushion pad, respectively;
   a computing device configured to numerically compute the die cushion forces to be generated at the respective positions of the cushion pad based on the one die cushion force from the first input device and the additional information from the second input device;
   a die cushion force command device configured to generate die cushion force commands for the die cushion force generators, respectively, based on the die cushion forces from the computing device; and
   a die cushion force controller configured to control each of the die cushion force generators based on corresponding one of the of die cushion force commands from the die cushion force command device to cause the die cushion force generators to generate the die cushion forces, respectively.

2. The die cushion apparatus according to claim 1, wherein the one die cushion force from the first input device is a total die cushion force, which is a sum total of the die cushion forces generated by the die cushion force generators, or one of the die cushion forces.

3. The die cushion apparatus according to claim 1, wherein the additional information from the second input device is information about a position (x1, y1) of a point on the cushion pad in a coordinate system whose origin is at a center of the cushion pad, whose X coordinate is a right-and-left direction, and whose Y-axis is a front-and-rear direction such that when the total die cushion force, which is the sum total of the die cushion forces generated by the die cushion force generators, is applied to the position (x1, y1) of the point, a moment around an axis X=x1 parallel to the Y-axis and a moment around an axis Y=y1 parallel to the X-axis, produced by die cushion forces at cushion pad mounting positions on the respective driving shafts of the die cushion force generators, will both be equal to 0.

4. The die cushion apparatus according to claim 2, wherein the additional information from the second input device is information about a position (x1, y1) of a point on the cushion pad in a coordinate system whose origin is at a center of the cushion pad, whose X coordinate is a right-and-left direction, and whose Y-axis is a front-and-rear direction such that when the total die cushion force, which is the sum total of the die cushion forces generated by the die cushion force generators of, is applied to the position (x1, y1) of the point, a moment around an axis X=x1 parallel to the Y-axis and a moment around an axis Y=y1 parallel to the X-axis, produced by die cushion forces at cushion pad mounting positions on the respective driving shafts of the die cushion force generators, will both be equal to 0.

5. The die cushion apparatus according to claim 3, wherein:
   the driving shafts are two shafts or four shafts; and
   when the driving shafts are four shafts, the additional information from the second input device further contains information about one of the die cushion forces.

6. The die cushion apparatus according to claim 4, wherein:
   the driving shafts are two shafts or four shafts; and
   when the driving shafts are four shafts, the additional information entered via the second input device further contains information about one of the die cushion forces.

7. The die cushion apparatus according to claim 1, wherein the additional information from the second input device is information concerning an inclination of an imaginary straight line or imaginary plane passing through a center of a straight line or plane which links cushion pad mounting positions on the respective driving shafts of the die cushion force generators when heights of the imaginary straight line or imaginary plane at the respective cushion pad mounting positions on the driving shafts are associated with magnitudes of the die cushion forces at the respective cushion pad mounting positions on the driving shafts.

8. The die cushion apparatus according to claim 2, wherein the additional information from the second input device is information concerning an inclination of an imaginary straight line or imaginary plane passing through a center of a straight line or plane which links cushion pad mounting positions on the respective driving shafts of the die cushion force generators when heights of the imaginary straight line or imaginary plane at the respective cushion pad mounting positions on the driving shafts are associated with magnitudes of the die cushion forces at the respective cushion pad mounting positions on the driving shafts.

9. The die cushion apparatus according to claim 7, wherein:
- the driving shafts are two shafts or four shafts; and
- the information concerning the inclination of the imaginary straight line or imaginary plane entered via the second input device is information indicating a slope or inclination angle of the imaginary straight line when the driving shafts are two shafts, and is information indicating a rotational direction of the imaginary plane and a slope or inclination angle of the imaginary plane when the driving shafts are four shafts.

10. The die cushion apparatus according to claim 8, wherein:
- the driving shafts are two shafts or four shafts; and
- the information concerning the inclination of the imaginary straight line or imaginary plane entered via the second input device is information indicating a slope or inclination angle of the imaginary straight line when the driving shafts are two shafts, and is information indicating a rotational direction of the imaginary plane and a slope or inclination angle of the imaginary plane when the driving shafts are four shafts.

11. The die cushion apparatus according to claim 1, further comprising a third input device used to manually enter each of the die cushion forces.

12. The die cushion apparatus according to claim 1, further comprising a display device which displays the die cushion forces computed by the computing device, by associating the die cushion forces with the cushion pad mounting positions on the respective driving shafts of the die cushion force generators.

13. The die cushion apparatus according to claim 1, further comprising a die cushion force setting method selector used to select one of die cushion force setting methods for setting the die cushion forces using the die cushion force setting device.

14. The die cushion apparatus according to claim 13, further comprising a die cushion position selector used to select one of die cushion positions, wherein
- the die cushion force setting method selector allows one die cushion force setting method to be selected for each die cushion position selected by the die cushion position selector.

* * * * *